United States Patent
Wang

[11] Patent Number: 5,899,609
[45] Date of Patent: May 4, 1999

[54] DEVELOPING UNIT AND DEVELOPING METHOD

[75] Inventor: Bobo Wang, Palos Verdes, Calif.

[73] Assignee: Aetas Peripheral Corporation, Wilmington, Del.

[21] Appl. No.: 08/887,743

[22] Filed: Jul. 3, 1997

Related U.S. Application Data

[60] Provisional application No. 60/021,393, Jul. 9, 1996, and provisional application No. 60/021,377, Jul. 9, 1996.

[51] Int. Cl.$^6$ .................................................. G03G 15/08
[52] U.S. Cl. ........................................... 399/281; 399/272
[58] Field of Search .................................... 399/281, 272, 399/265, 270, 271; 430/120

[56] References Cited

U.S. PATENT DOCUMENTS

| | | |
|---|---|---|
| 4,907,032 | 3/1990 | Enoguchi et al. . |
| 5,539,502 | 7/1996 | Koshino et al. . |
| 5,541,722 | 7/1996 | Ikeda et al. ........................... 355/326 R |
| 5,557,394 | 9/1996 | Haneda et al. ............................ 355/327 |
| 5,826,138 | 10/1998 | Tsuru et al. ................................ 399/55 |

OTHER PUBLICATIONS

Abstract of Japanese Document JP–A–08006372, Published Jan. 12, 1996.

*Primary Examiner*—Richard Moses
*Attorney, Agent, or Firm*—Baker & Botts, LLP

[57] ABSTRACT

A developing unit includes a housing enclosing a mesh belt stretched across first and second rollers. The belt passes between a pair of friction plates that can be used to tribocharge toner particles carries on the mesh belt. Charging occurs over the large width of the entire mesh belt and the friction plates. Toner is transported on the surface of the mesh belt to a developing roller which, in turn, transports the toner to the surface of a photoconductor. The configuration of this developing unit reduces the loading associated with the tribocharging operation and the belt transport system reduces the volume of the developing unit.

23 Claims, 5 Drawing Sheets

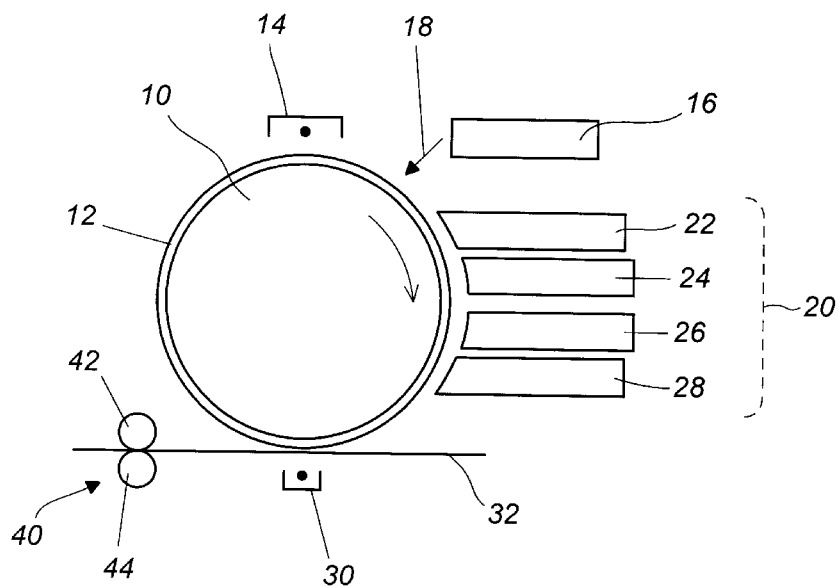
FIG. 1 -- Prior Art
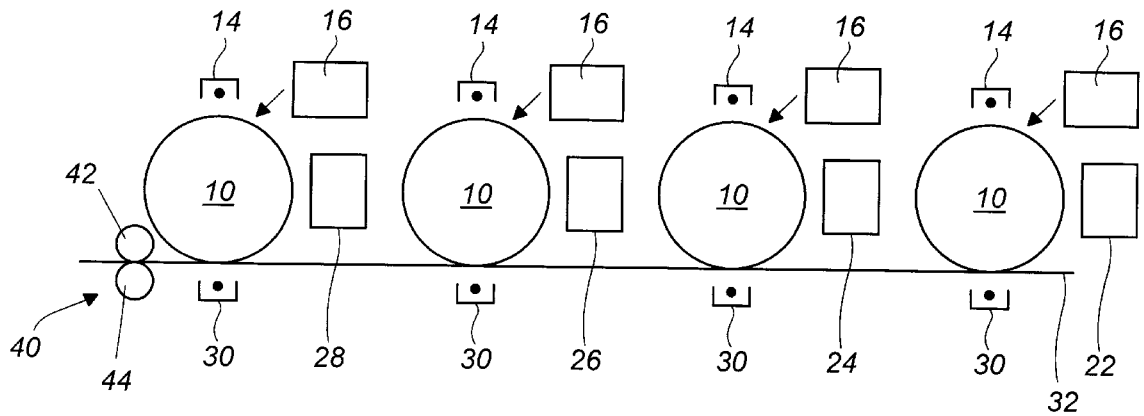
FIG. 2 -- Prior Art

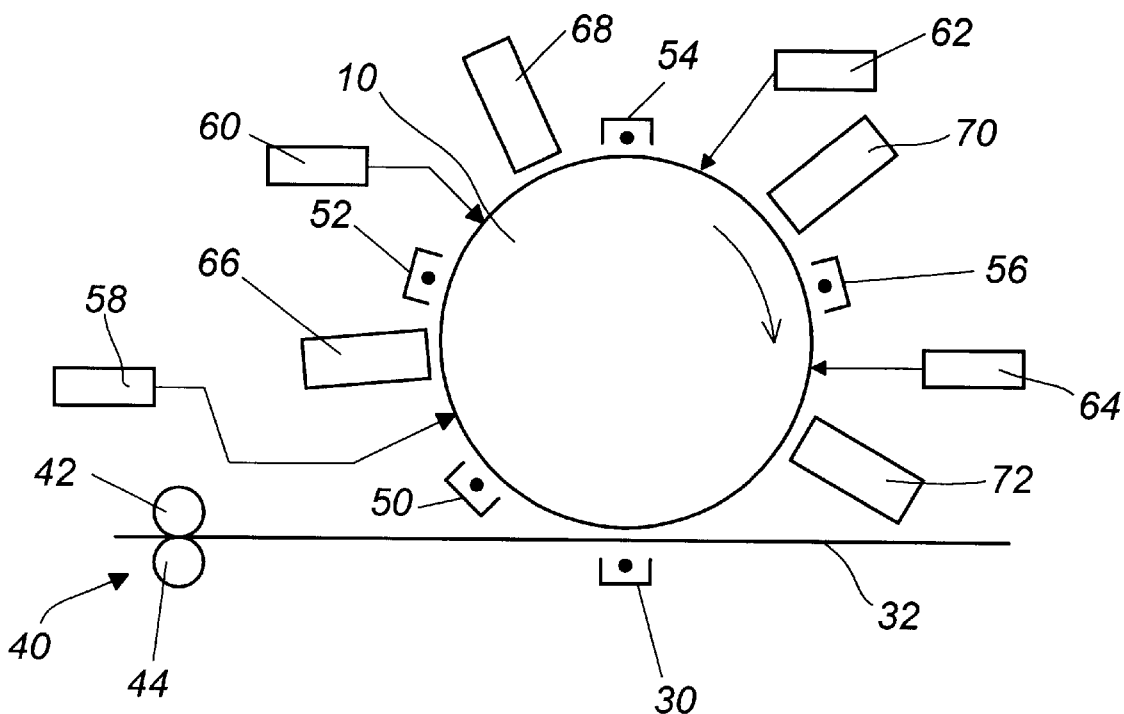
FIG. 3 -- Prior Art
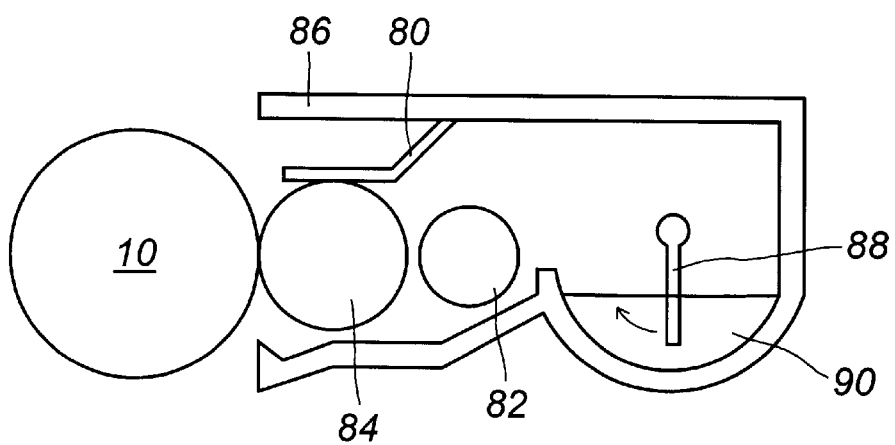
FIG. 4 -- Prior Art

DEVELOPING UNIT AND DEVELOPING METHOD

This application claims priority from U.S. provisional patent application Ser. No. 60/21,393, filed Jul. 9, 1996 and from U.S. provisional patent application Ser. No. 60/21,377, filed Jul. 9, 1996. This application is related to U.S. patent application Ser. No. 08/888,221, filed on Jul. 3, 1997.

BACKGROUND OF THE INVENTION

1. Field of the Invention

The present invention relates to electrophotographic processes and, more particularly, to an apparatus and a method for developing images in an electrophotographic process.

2. Description of the Related Art

Most computer systems, and most particularly small or "personal" computer systems, have been making increasing use of colors in the display of information. The increasing use of color in personal computers reflects both the more ready availability of low price color displays and the more powerful and faster microprocessors that are used in personal computers. The technology for providing printed color output, i.e., "hard copy" output such as color printouts on paper, plastic or other materials, has not kept pace with the technology for the color display of information. Presently, the options available for color hard copy output either do not present sufficiently high quality output or are undesirably expensive for home or small office use. Examples of this conventional color output technology include ink jet printing, whether using liquid or solid inks, as well as a few different implementations of color electrophotographic printing. Ink jet printing is comparatively inexpensive, at least when using liquid inks, but tends to be slow and it is difficult to obtain acceptably high quality output using liquid ink jet printing technology.

Color electrophotographic printing is commercially available, but tends to be expensive and slow. For example, multipass color electrophotographic printing is a process by which multiple photoconductor exposures and multiple developing processes are used to create a multicolor image on the surface of a paper sheet. In essence, conventional multipass color electrophotographic printing consists of repeated application of single color or monochrome electrophotographic printing processes using different colors for each successive application or pass through the multipass printer. Traditional monochrome (black and white) electrophotographic printing forms an image on the optically active surface of a photoconductor by exposing the photoconductor using a laser or an equivalent high intensity light source. Before exposure, a uniform charge distribution is provided over the surface of the photoconductor and, after exposure, a charge pattern corresponding to the exposure image to be printed is present on the surface of the photoconductor. The latent image corresponding to the charge pattern on the surface of the photoconductor is converted to a physical image by a developer which adheres charged toner particles to the charge pattern on the photoconductor in a pattern corresponding to the latent image. The toner image is transferred onto a paper sheet using an electrostatic transfer process and then fusing is performed to fix the toner image on the paper sheet. In a multipass color laser printer or other similar electrophotographic apparatus, this printing process would be repeated several times.

FIG. 1 illustrates a conventional, multipass color electrophotographic apparatus which is assumed to be a laser printer for the purposes of this discussion. The multipass laser printer of FIG. 1 includes a photoconductive drum 10, a charger 14 for creating a uniform charge distribution on the surface of the photoconductive drum 10, a laser beam scanning unit 16 for exposing the surface of the photoconductive drum with an optical image, a developing device 20 including a plurality of single color developing units 22, 24, 26, 28 for developing a latent image, a transfer charger 30 for applying a transfer electrical field, and a fuser 40 for fixing an image onto a recording medium 32 such as a paper sheet. The photoconductive drum 10 is generally a metal cylinder covered by an optically active material 12 known as the photoconductor. The photoconductor generally is highly insulative in the dark while developing a substantial level of conductivity under illumination. Thus, the photoconductor 12 can hold a charge on its surface in the dark, but charge on the surface of the photoconductor is discharged under illumination.

In operation, a uniform charge is applied to the surface of the photoconductor 12 at the beginning of each pass of the multipass color printing process. Charging of the photoconductor surface is accomplished with charger 14, which typically uses corona charging or a similar technique to provide charge to the surface of the photoconductor 12. After the charging operation, the photoconductor 12 has on its surface a uniform charge distribution corresponding to a voltage of $\pm 600 \sim \pm 800$ V. When the photoconductor 12 is exposed by the laser beam scanning unit 16, a laser beam 18 directed by the scanning unit 16 illuminates a specified area of the photoconductor 12 in accordance with an image modulation pattern generated by a controller (not shown). The voltage on the portions of the photoconductor 12 illuminated by the laser beam 18 is discharged to approximately $0 \sim \pm 150$ V.

Multipass color laser printing is accomplished by successively forming on the surface of the photoconductor 12 successive monochrome images so that, when all of the monochrome images are combined together on the photoconductor 12, the combined image provides an acceptable color image. Typical multipass color electrophotographic strategies use four printing passes, with each successive pass applying a different optical image to the photoconductor corresponding to a different monochrome image component. Each successive image is developed after the exposure portion of the pass with a developer having the appropriate color of toner corresponding to that monochrome portion of the image. To effect this strategy, it is necessary to provide four different developing units 22–28 as shown in FIG. 1 having four distinct colors of toner to be applied in successive ones of four different passes. Thus, four developing units 22–28 corresponding to yellow (Y) toner, magenta (M) toner, cyan (C) toner and black (K) toner respectively are provided for the FIG. 1 printers. The reproduced image is therefore made up of a plurality of colors applied in varying concentrations to achieve various gray levels.

In a first pass of the multicolor printing process of FIG. 1, the laser beam scanning unit 16 exposes the surface of the photoconductor with modulated laser light 18 to create a first latent image component corresponding to the first monochrome component of the image to be printed. After the photoconductor 12 is exposed with the first latent image component, the first component of the image pattern is developed using a first developer 22, described in greater detail below, to provide a first color of toner to the surface of the photoconductor. After the first monochrome component of the color image to be printed has been provided on the surface of the photoconductor, a second pass is performed to provide a second monochrome component of the color image to be printed. The photoconductor 12 on the drum is charged to provide a new uniform charge distribution on the photoconductor. The laser beam scanning unit 16 then scans the laser beam 18 over the surface of the photoconductor to expose the photoconductor 12 with a second latent image component. A second color of toner is applied by the second developing unit 24 so that it adheres to the photoconductor 12 in a pattern corresponding to the second latent image component and overlies the first toner image. This process is repeated for the third and fourth components of the image, using the third and fourth developing units 26 and 28, respectively, to provide four different overlaid monochrome toner images on the photoconductor. The four color toner image is then transferred onto the surface of a recording medium 32 such as a paper sheet at the transfer charger 30 and the toner image is fused to the recording medium 32 at fuser 40. To accomplish fusing, the recording medium 32 is passed between the heating roller 42 and the pressing roller 44 that make up the fuser 40. A heater, such as a halogen lamp, is provided in the heating roller 42 to heat a surface of the roller to a predetermined high temperature sufficient to at least soften the developer, when combined with the pressure applied by the pressure roller 44. The high temperature and pressure between these two rollers cause the toner to melt and to be fixed onto the recording medium 32, thereby forming a color image on the recording medium.

For the four pass color laser printer illustrated in FIG. 1, four developing processes are needed to create an image. Because the FIG. 1 printer essentially requires four complete and independent printing processes to create an image, the FIG. 1 printer is about four times as slow as a conventional monochrome laser printer. As such, the color image reproduction rate for the FIG. 1 printer is generally unacceptably slow.

FIG. 2 is a schematic view showing a different conventional implementation of a color electrophotographic apparatus. The "tandem" color electrophotographic apparatus of FIG. 2 is similar to the apparatus of FIG. 1 in that the printed color image is built up over the course of repeated distinct monochrome printing processes. For the FIG. 2 apparatus, however, the four distinct printing processes are performed in series on four distinct drums 10 having associated chargers 14, laser beam scanning units 16, four distinct developers 22, 24, 26, 28 carrying four different colors of toner, and four transfer chargers 30. Operation of the FIG. 2 apparatus is generally similar to that of the FIG. 1 apparatus, with the primary exception that each component of the latent image is formed on different photoconductive drums by dedicated laser beam scanning units in the FIG. 2 apparatus. Like elements in FIG. 2 are represented by like reference numerals in FIG. 1. A first color image is formed and then transferred to a recording medium 32 from the first photoconductive drum 10, and then second, third and fourth color images are successively transferred from the second, third and fourth photoconductive drums in sequence. As illustrated, the FIG. 2 structure can accommodate a linear transport path for the recording medium 32 so that the four color components of the image can be transferred to the recording medium in a single transport operation. Thereafter, a fuser 40 fixes the resultant four component image on the recording medium 32. The apparatus of FIG. 2 is advantageous in that the reproduction rate thereof is much higher than that of the apparatus shown in FIG. 1 since the four developing processes can proceed simultaneously. The tandem color electrophotographic apparatus of FIG. 2 has undesirable characteristics, however. Although the FIG. 2 apparatus is improved over the FIG. 1 apparatus, there remains in the FIG. 2 apparatus a difficulty in obtaining a desirable level of registration between the successive images transferred onto the paper sheet or other recording medium due to the need to align four different drums with the recording medium for the four successive toner transfer operations. More importantly, the FIG. 2 apparatus can be undesirably large and expensive due to the need to provide multiple complete print stations.

A different implementation of a color electrophotographic apparatus is illustrated in FIG. 3. The illustrated color laser printer provides four color components for a printed color image while using a single pass printing operation. The FIG. 3 laser printer includes a photoconductive drum 10 with four printing stations, each including a charger 50–56, a laser beam scanning unit 58–64 and a developer 60–72, all arranged around the circumference of the drum. At the first printing station, the drum 10 is charged to an initial uniform voltage by the charger 50, the drum is exposed according to a first component of the image to provide a first latent image component, and the first latent image component is developed by the developer 66 to produce a first toner pattern on the surface of the drum. The second printing station repeats this process using a second charger 52 to reproduce a uniform charge distribution over the surface of the drum 10, including over the portions of the drum covered by the first toner image. As second toner image is created on the surface of the drum and is overlaid with the first toner image. Third and fourth color image components are created on the surface of the drum 10 as the drum rotates through the third and fourth developing stations to provide a four component, four color toner image on the surface of the drum. The four color toner image is then transferred onto the recording medium 32 by transfer charger 30, and four color image is fused onto the recording medium 32 at fuser 40.

The FIG. 3 single pass color printer provides color output at higher speeds than the multipass design illustrated in FIG. 1. As a practical matter, however, it is difficult to achieve the necessary registration of images for the FIG. 3 apparatus because of the exacting alignment accuracy required to obtain registration of the images created at successive ones of the printing stations. To obtain acceptable levels of registration for the different image components of the FIG. 3 design, it is necessary to arrange the four different laser beam scanning units 58–64 so that the laser beams trace lines on the surface of the drum that are parallel to the cylindrical axis of the drum to a very high degree. Because this alignment requires precise positioning of five objects in relation to each other in three dimensional space, it is very difficult to achieve an acceptable level of alignment, so that the FIG. 3 apparatus is not amenable to high volume manufacturing techniques. The difficulty of aligning the four laser beam paths is heightened because the lasers are typically scanned using high speed rotating polygon mirrors, with each mirror rotating independently of all others. Small variations in mirror position will thus be magnified by the long path traced by the laser beam reflected from the mirror to the surface of the drum.

A further difficulty with the apparatus of FIG. 3 is that it tends to be large. The drum 10 must be made sufficiently large so that the four different print stations and the transfer charger 30 can be arranged about its periphery. Thus, it is difficult to make the apparatus of FIG. 3 in a small enough form factor to comfortably fit into the home and small office operating environments. One attempt to address this issue is illustrated in U.S. Pat. Nos. 5,541,722 and 5,557,394, which modify the design of the FIG. 3 apparatus by providing light emitting diode arrays as optical exposure units within a transparent drum that has a photoconductor formed on its surface. While this modification achieves reduced size, it requires the use of a transparent drum, which is generally undesirable for reasons of both cost and performance. Additionally, the design strategy of these two patents is limited in its potential for success because the modifications do nothing to reduce the space required by the developing units, which typically occupy a far larger volume than the optical exposure units.

It is thus desirable to provide an improved configuration for an electrophotographic apparatus. An associated, but distinct consideration in the design of high performance, low cost electrophotographic systems is the desirability of providing a more compact and higher performance developer. To appreciate this design consideration, it is useful to consider the design of a conventional developing unit used in some electrophotographic processes, illustrated in FIG. 4. The developing unit of FIG. 4 generally comprises a conductive roller that transports a developer consisting of a mixture of magnetic carrier particles and plastic or other toner ink particles to the surface of a photoconductive drum which carries a latent image. The developing unit includes roller, stirrers or other mechanisms to agitate the developer. The agitated developer adheres to the surface of the roller and a predetermined thickness of developer is maintained on the roller by use of a doctoring blade. The toner is triboelectrically charged and the toner and carrier are carried from a reservoir within the developing unit to a position adjacent the photoconductive drum by the roller as the roller rotates in an opposite sense to the photoconductive drum. A developing bias from a d.c. power supply and/or an a.c. power supply is applied between the photoconductive drum and the developing unit to form an electrical field that transports the developer from the roller to the photoconductive drum.

FIG. 4 shows an exemplary structure of a conventional developing unit in which a tribocharging blade 80 and a feed roller 82 are provided adjacent to a developing roller 84 within a housing 86. The tribocharging blade 80 is held against a surface of the developing roller 84, for example, by a spring mechanism. A stirrer 88 is provided within the reservoir of the developer mixture of carrier and toner 90. During developing, the toner 90 is agitated by the stirrer 88 and then distributed on a surface of the feed roller 82. Next, the toner 90 on the surface of the feed roller 82 is conveyed to the surface of the developing roller 84 by the feed roller. At the same time, a strong shearing force between the tribocharging blade 80 and the developing roller 84 causes the toner 90 to be tribocharged. Subsequently, the toner 40 is selectively transferred to a surface of a photoconductor 10 by the electrostatic mechanism discussed above, thereby achieving the developing operation.

In the conventional developing unit discussed above, there are a range of problems observed:

(1) The load caused by the frictional force between the tribocharging blade 80 and the developing roller 84 is large and the fluctuation in that load can be dramatic, resulting in variations in the charging of the toner 90.

(2) A nip between the tribocharging blade 80 and the developing roller 84 is small, introducing further instability to the tribocharging of the toner.

(3) Toner particles are crushed by the strong shearing force between the tribocharging blade 80 and the developing roller 84, resulting in a fogging effect and reducing the image quality.

(4) The reservoir for storing the toner is separated from the other developing mechanisms. The configuration of the developing unit tends to be complicated, resulting in wasted space and in residual toner being left in the developing unit that cannot be accessed in developing operations.

It is therefore desirable for a developing unit to have a smaller volume, improved integration and improved performance as a part of an overall strategy to facilitate the production of a high performance, readily manufactured color electrophotographic printing apparatus.

SUMMARY OF THE PREFERRED EMBODIMENTS

It is an object of the present invention to provide a simple and compact developing unit which has improved performance.

It is another object of the present invention to provide a developing unit which has comparatively low internal loading and which can smoothly and stably charge the contents of the developing unit.

It is another object of the invention to provide a developing method which does not apply an unacceptable level of shearing force to toner and which provides sufficiently undamaged toner as to produce high quality images.

Particularly preferred embodiments of the present invention provide a transportation device within the developing unit, such as a mesh belt, for moving toner within the developing unit. For such embodiments, it is possible to achieve charging of the toner by causing the belt or other transportation belt to carry the toner between opposed friction plates.

One aspect of the present invention provides a developing unit of the type that might be used for electrophotography having a housing for enclosing components of the developing unit, the housing having an opening through which toner can pass. First and second rollers are provided in the housing with a belt extending over the first and second rollers so that the belt is translated around the first and second rollers in response to rotation of the first and second rollers. The belt is capable of transporting toner on a surface of the belt. A charging device is provided adjacent at least a portion of the belt, the charging device imparting a charge to toner on the belt passing adjacent the charging device. An output device transports toner from the surface of the belt to the opening in the housing.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

FIG. 1 is a schematic view showing a conventional multipass color electrophotographic apparatus.

FIG. 2 is a schematic view showing a conventional tandem color electrophotographic apparatus.

FIG. 3 is a schematic view showing a conventional single pass color electrophotographic apparatus.

FIG. 4 illustrates a conventional developing unit that might be used in conjunction with one or more of the electrophotographic systems shown in FIGS. 1–3.

DETAILED DESCRIPTION OF THE PREFERRED EMBODIMENTS

Figure 5:
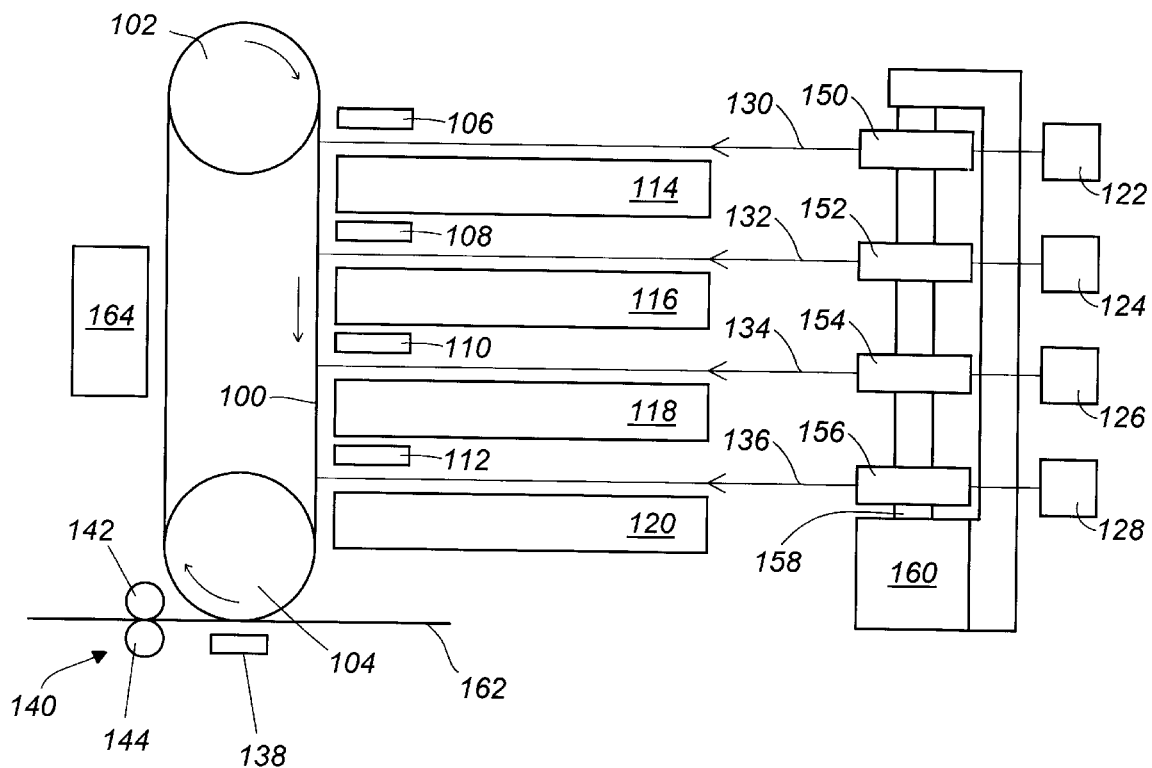
FIG. 5 shows a color electrophotographic apparatus according to the present invention.

The present invention provides an electrophotographic apparatus that produces color hard copy output, preferable in a single pass process and most preferably using a highly manufacturable and compact configuration. In one aspect, the present invention provides an electrophotographic system having a photoconductor with a planar surface along at least part of its path. The associated laser beam scanning units or other optical exposure units for the electrophotographic system are positioned so that the exposure light from each of the optical exposure units extends perpendicularly to the planar surface of the photoconductor. By positioning all of the optical exposure units so that their light outputs are incident on the planar portion of the photoconductor, alignment of the optical exposure units requires only that the units be adjusted so that their output beams are parallel to one another. This is a much simpler alignment problem than is presented by the single pass electrophotography system illustrated in FIG. 3. In aligning the system of FIG. 3, it is necessary to precisely select the four distinct planes traced by the four beam scanning systems in a three dimensional space and to position those four planes with respect to a cylindrical surface. Aligning electrophotographic systems formed in accordance with the present invention requires only that four optical exposure mechanisms be positioned so that their optical output beams trace parallel lines on the surface of the planar portion of the photoconductor. From one point of view, alignment of systems in accordance with this aspect of the invention is like solving a two-dimensional problem, while the alignment of the FIG. 3 apparatus requires solution of a harder three-dimensional problem. Those skilled in the art of optics and alignment of optical systems will recognize that making the four or more exposure beams of preferred embodiments of this invention trace parallel optical paths is a much simpler task than is involved in aligning the FIG. 3 system. In addition, such preferred embodiments will have far greater stability than conventional systems like the FIG. 3 apparatus and so will tend to retain their alignment better. Thus, preferred embodiments of the present invention are expected to not only be less expensive to manufacture but also to have better durability.

Several other aspects of the present invention facilitate the implementation of a photoconductor having a planar surface in conjunction with four exposure units disposed to output parallel beams. One of these aspects is the use of a smaller developing unit. In the system illustrated in FIG. 3, the developing units occupy large volumes as a natural consequence of the design of these developing units. Thus, it is likely difficult to modify the drum of the FIG. 3 apparatus to provide a planar surface on which images can be formed without making the apparatus undesirably large. By using a more efficient and compact design for the developing unit, preferred embodiments of the present invention accommodate the use of a planar configuration for the photoconductor and other parts of a print engine. Briefly, particularly preferred embodiments of certain aspects of the present invention provide a developing unit having a mesh or web belt for the internal transport of toner within the developing unit, allowing for different configurations of developing units to be used which more efficiently use space. The use of a more active toner transport mechanism also allows the shape of the developing unit to be selected to optimize the integration of the overall system. The developing unit can be made still more compact in some embodiments by using a single component developer, in contrast to the more conventional multicomponent developer. If the developer has only toner particles and no carrier particles, the reservoir for developer will be used more efficiently, allowing the reservoir to me made smaller and thus allowing the developing unit to be made smaller.

Another aspect of the present invention which facilitates the use of a planar printing surface for the photoconductor is the use of highly integrated optical exposure units. In one configuration, the optical exposure units might include four polygon mirrors that, along with the shaft on which the mirrors are mounted and which is used to rotate the mirrors, are formed from a single piece of plastic in a process that readily produces mirror faces that are aligned and parallel to a high degree. Thus, when four laser beams are scanned by this configuration of optical exposure unit, the four scanned beams trace through four parallel planes with comparatively little alignment required. In another configuration, the optical exposure unit might include a rigid frame on which four LED arrays ("bars") are mounted. It is well within the characteristics of the LED manufacturing process and within typical mechanical tolerances to align the LED arrays so that the LED arrays optical output extends along parallel planes. These and other configurations of optical exposure units for the present invention facilitate the planar configuration of the print engine of some preferred embodiments of the present invention. In addition, these optical exposure units are readily manufactured and integrated with the system to make the manufacture of the entire electrophotography system less expensive.

These and other aspects of the present invention are now discussed with particular reference to certain preferred embodiments and with reference to the figures. Implementations of the present invention use many components which are commercially available or are otherwise well known. As such, detailed descriptions of these components are not provided here so that the description is more concise and better emphasizes the distinctive aspects of the invention's electrophotographic apparatus. It should be appreciated that the following description emphasizes a four color laser printer, but other electrophotographic systems might also benefit from the principles of the present invention. For example, a color copier based on scanned images which are separated into different color components stored in different memories would readily implement aspects of the present invention. In addition, the present invention is not limited to four colors. Embodiments of the present invention readily incorporate additional (or fewer) printing stations with only simple modifications.

FIG. 5 shows a color electrophotographic apparatus according to the present invention. As shown, the color electrophotographic apparatus comprises flexible photoconductor 100 extending as an endless belt around a roller set including a first roller 102 and a second roller 104. The rollers 102, 104 are spaced apart by a sufficient distance that the planar surface defined on one side of the photoconductor 100 is large enough to allow the various print stations to be positioned along that planar printing surface. Stability of the planar printing surface can be maintained by positioning a tensioning plate on the opposite surface of the photoconductor between the rollers. Further improvement in the stability of the planar printing surface can be provided by positioning a plate adjacent to and behind the planar printing surface. The lateral position of the photoconductor 100 is maintained by one or more limiting pins placed on one or more of the rollers 102, 104 to prevent lateral movement of the photoconductor 100 during rotation. In the illustrated embodiment, the rollers are driven, or one of the rollers is driven, to translate the photoconductor through the printing region continuously in a downward direction. The translation direction defines an ordering for the elements within the four illustrated print stations. The print stations include chargers 106–112 positioned as the first element of each of the print stations. Four developing units 114–120 are interposed between the chargers 106–112. Four laser beam scanners are provided for the four print stations which are formed of semiconductor lasers 122–128 for emitting laser beams 130–136 that pass through gaps between the chargers 106–112 and the corresponding developing units 114–120 and reach the planar printing surface of the flexible photoconductor 100. The illustrated electrophotographic system also includes a conventional transfer charger 138, and, for example, a conventional fuser 140 including a heating roller 142 and a pressing roller 144. The chargers, laser beam scanners, and developing units together make up four distinct print stations for providing (in order along the direction of rotation) yellow (Y), magenta (M), cyan (C) and black (K) toner image components to the photoconductor.

According to a particularly preferred embodiment of the present invention, the flexible photoconductor 100 comprises a belt-shaped flexible substrate coated with an organic photoconductor. The substrate of the belt is typically chosen to be highly conductive and might consist of a metal mesh or web or a plastic coated with a film of metal so that the substrate can act as a ground plane for the photoconductor. When the substrate of the belt is formed from a plastic, it may also be desirable to choose a conductive plastic, so long as the plastic provides the desired flexibility characteristics. The conductive substrate of the belt is coated with a photoconductive material such as an amorphous semiconductor or an organic photoconductor. Often, organic photoconductors are preferred because they tend to be more flexible and have a longer history of use. The photoconductor preferably is substantially insulative so that charge provided onto the surface of the photoconductor remains on the surface of the photoconductor for sufficient time to pass through a print station, so long as the photoconductor in maintained in the dark. It is also desirable for the photoconductor to be rapidly discharged upon application of light of the wavelength and intensity of the laser beams 122–128. Organic photoconductors are commercially available from, for example, Eastman Kodak Company and Mitsubishi Chemical Corporation. Of course, other photoconductors having similar flexibility and photoconductive properties can be used.

Each of the laser beam scanners is associated with one of the polygon mirrors and with the well known focusing and collimating optics used with semiconductor lasers within laser printers. A shaft 158 passes through the aligned central axes of the polygon mirrors 150–156 and is driven by a motor 160 to rotate the polygon mirrors. Alternately, if higher rotational speeds are desired, the shaft may be rotated on an air bearing as is known in the electrophotographic arts. The illustrated mirrors 150–156 might each have a square cross section and the entire assembly might be formed from a single piece of plastic. In one simplistic approach, the mirror assembly might be formed from a starting rectangular prism block of plastic having a uniform, square cross section by turning the block using a lathe to define the shaft portions between the mirrors. The mirror faces would then be rendered reflective, for example, by sputter coating the faces with aluminum and then the mirror assembly is ready for use. The resulting mirror assembly will have four polygon mirrors held in fixed alignment with parallel and aligned faces. More practically, the mirror assembly can be formed by injection molding of plastic followed by coating the mirror surfaces with a metal film such as aluminum. Such a molding process can be accomplished with sufficient accuracy to ensure that the mirror faces will be aligned and parallel within the required tolerances.

The use of a fixed mirror assembly or optical exposure unit facilitates the alignment of the FIG. 5 electrophotographic system, since alignment can be accomplished by properly positioning the mirror assembly with respect to the planar printing surface of the photoconductor and then performing relatively simple focusing and alignment operations for each of the semiconductor lasers 122–128. Therefore, the array of four parallel laser beams 130–136 emitted from the laser beam scanners can scan the surface of the photoconductor 100 in a direction perpendicular to the moving direction of the photoconductor 100 as they are reflected by the rotating polygon mirrors 150–156 with a high degree of accuracy.

As is known in the art, including the art discussed in the background above, each of the lasers 122–128 is connected to a modulating circuit that modulates the lasers with the information necessary to create yellow, magenta, cyan and black image components, respectively. The commercially implemented modulation schemes of available color laser printers are in most regards adequate for use with the present system and so will not be described further herein. On the other hand, certain modifications to the known modulation schemes facilitate the assembly and alignment of the FIG. 5 system. Vertical registration between the successive yellow, magenta, cyan and black image components is obtained by varying the timing between the respective modulation patterns on the basis of the transport speed of the photoconductor 100. In particularly preferred embodiments of the present invention, the delays between the successive color image components are programmed into nonvolatile memories (EPROM, EEPROM or flash) at the time of manufacture so that the registration can be empirically determined for each printer. Thus, an initial alignment of the system is accomplished and then testing is performed to determine alignment between successive color image components. This testing might be accomplished by printing test patterns, as is known in the art. Adjustments in the relative delays optimize the resignation between successive color image components and then these optimized delays are stored in the nonvolatile memories. By this strategy, registration with one half pixel or dot accuracy is accomplished between all four color image components during the initial set up of the FIG. 5 system.

Figure 6:
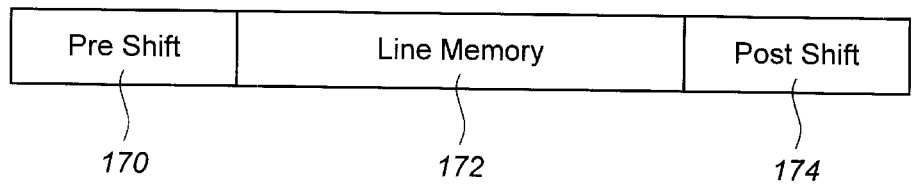
FIG. 6 schematically shows one of the line memories used in storing data to be used in modulating the optical exposure mechanism.

Horizontal registration can be optimized in a similar manner. The data used to generate the modulation signals used to drive cach of the lasers 122–128 are stored in line memories corresponding to each of the lasers. Four different line memories are provided for the respective lasers and color image components to be generated and each of the line memories is configured as illustrated in FIG. 6 with a preshift register 170, a line memory register 172 and a postshift register 174. The general representation of the line memory shown in FIG. 6 is appropriate whether the modulation data are single bit data stored in a shift register or are data words stored in an array of shift registers. By use of the illustrated register array, the desired modulation data an be shifted to the right or to the left in the memory to advance or delay the modulation signal with respect to the other line memories. The advance or delay of each horizontal line of each color image component can thus be adjusted to obtain better horizontal registration between all of the color image components. In particularly preferred embodiments of the present invention, the relative advance and delay of each of the line memories is adjusted during manufacture and stored, for example in a nonvolatile memory, to obtain horizontal registration between the different color image components with one half pixel or dot accuracy.

The image reproduction operation of the FIG. 5 color electrophotographic apparatus according to the present invention proceeds as follows. At first, the rollers 102 and 104 are rotated to move the flexible photoconductor 100 and then the first charger 106 applies a voltage of −600−−800 V (in this embodiment, for example, −700 V) to a leading portion of the planar printing surface of the photoconductor 100. When the uniformly charged surface of the photoconductor 100 passes through a gap between the first charger 106 and the first developing unit 114, the first laser beam 130 modulated with information for the first color image component impinges upon the charged area of the photoconductor 100 and discharges the photoconductor) in accordance with the information corresponding to the image to be printed. At this time, the voltage on the photoconductor corresponding to a blank (toner will not adhere) portion of the latent image is about −700 V while the voltage on the photoconductor corresponding to a non-blank (toner will adhere) portion is between ±150 and 0 V. Subsequently, when the charged area carrying the first latent image passes by the first developing unit 114, developer containing yellow toner is conveyed by the first developing unit 114 to the charged surface of the photoconductor 100 carrying the latent image, thereby developing the yellow image component. Next, magenta developer, cyan developer and black developer images are applied to the surface of the photoconductor, each color in sequence using a series of charging, discharging and developing operations like that described for yellow, so that a four color toner image is formed on the planar printing surface of the photoconductor 100. A recording medium 162, which is generally a sheet of pater, is transported to a space between the roller 104 and the transfer charger 138. The Y, M, C and K toner images on the surface of the photoconductor 100 are transferred to the recording medium 162 by means of an electric field produced between the photoconductor and the recording medium by the transfer charger 138. Then, the toner images are fused by the high temperature and high pressure provided by the fuser 140, fixing the four color toner image on the recording medium 162. Typically, the photoconductor belt is blanket discharged and cleaned of remnant toner or other debris at a cleaning station 164 positioned on a portion of the photoconductor 100 away from the planar printing surface. This cleaning station might also include a tensioning unit for maintaining an appropriate tension on the photoconductor during its transport.

Figure 7:
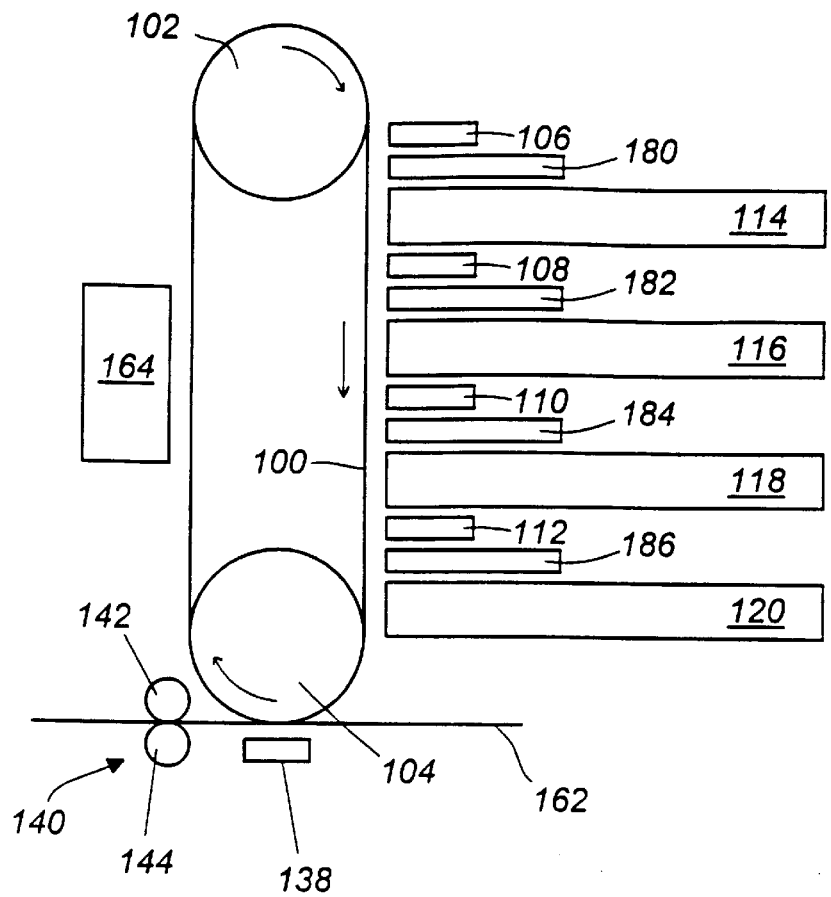
FIG. 7 shows another color electrophotographic apparatus according to the present invention.

In the embodiments of the present invention illustrated by FIG. 5, laser beam scanners having semiconductor lasers scanned by polygon mirrors are used. However, other light sources such as light emitting diode LEDs) or a light source modulated by liquid crystal devices (LCDs) can be utilized instead. FIG. 7 shows a color electrophotographic apparatus according to a second embodiment of the present invention wherein the laser beam scanners in the first embodiment are replaced with independently controllable arrays of LEDs or light sources modulated by LCDs 180–186. In this case, the semiconductor lasers 122–128, the polygon mirrors 150–156 and the associated optics in the FIG. 5 embodiments can be omitted. Therefore, in comparison with the electrophotographic apparatus according to the first embodiment, the apparatus of the second embodiments is advantageous in that the spatial volume thereof is smaller and the manufacturing cost is lower. Alternately, the developing units might be made larger to provide additional toner capacity. The LED arrays LCD modulated light sources 180–186 are mounted to a single rigid frame so that the optical exposure units 180–186 are held in fixed relationship to one another. Most preferably, the LED arrays are imaged onto the planar printing surface of the photoconductor 100 using cylindrical optics (such as fiber lenses) which extend across the entire LED array. Other optics might be necessary when using LCD modulation, depending on the nature of the light source. The optical exposure units 180–186 can be mounted to the rigid frame so that the optical output of the array on average propagates along parallel planes in a direction perpendicular to the planar printing surface of the photoconductor. As such, the optical exposure units 180–186 present similar levels of alignment simplification over the conventional system of FIG. 3 as are provided by use of the mirror assembly used in the FIG. 5 system.

Figure 8:
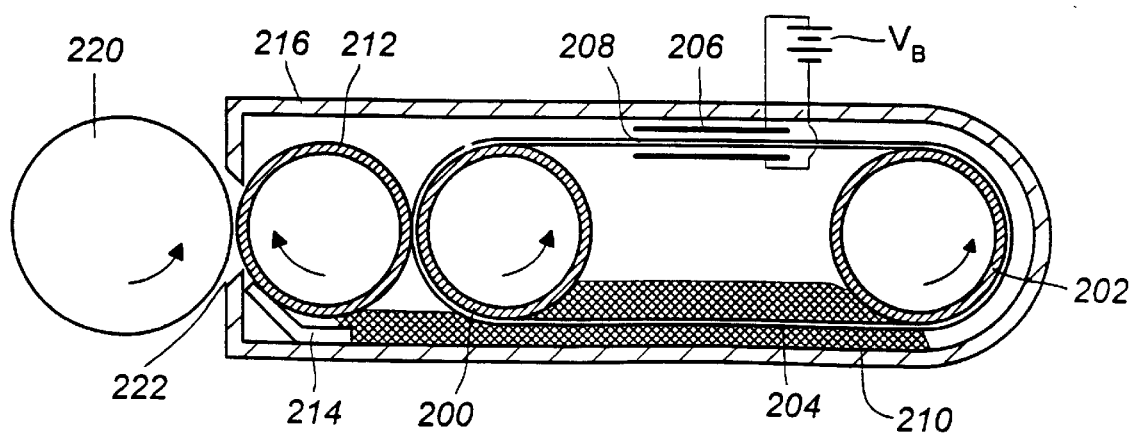
FIGS. 8–10 show different embodiments of a developing unit in accordance with the present invention.

As discussed above, the configuration of the electrophotographic systems of FIG. 5 and FIG. 7 is facilitated by use of a reduced volume developing unit. Such a reduced volume developing unit is provided in accordance with a different aspect of the present invention. While preferred embodiments of the present invention's developing unit find particular application in the systems illustrated in FIGS. 5 and 7, it should be appreciated that embodiments of the developing unit of the present invention can be used in other configurations of these and other electrophotographic systems. FIG. 8 shows a developing unit according to an embodiment of the present invention including a first roller 200, a second roller 202, a transportation device 204 which is typically a mesh or similar material, a friction device 206 positioned around a friction region 208 of the transportation device, toner 210 within a reservoir, a developing roller 212, and a thickness controlling blade 214. The FIG. 8 developing unit is provided within a housing 216. The illustrated transportation device 204 is a mesh or web belt stretched between the first roller 200 and the second roller 202, where the opening in the mesh or web of the belt are large enough that toner can readily pass though the openings on the surface of the belt. The first roller 200 is connected to a motor during operation to serve as a driving roller for the transportation device 204 and as a feed roller for conveying charged toner to a surface of the developing roller 212. The second roller 202 is used to restore the transportation device 204 in the illustrated embodiment.

The toner 210 carried by the transportation device 204 enters and passes through the friction device 206 before the toner reaches the developing roller. The friction device 206 includes two plates that sandwich the transportation device 204, with the plates being formed from a material selected so that the toner 210 is charged as it passes between the plates of the friction device 206. In some embodiments, the plates are metal and are connected to a bias $V_B$ which typically has a value of, for example, between about −300 to −700 V. Alternately, the charging plates might be formed from a dielectric (nonconductive) material such as synthetic fiber, paper, acrylic resin and the like. In this case, no bias is applied to the friction device 206 and charge is supplied to the toner solely by tribocharging.

An important aspect of the FIG. 8 developing unit design is that the charging plates of the friction device 206 face on the transportation device 204 over a large width and over a considerable length. This allows for high levels of tribocharging while imposing a relatively light and constant load on the transportation device. The charged toner 210 is conveyed to the first roller 200 and then from the transportation device 204 to a surface of the developing roller 212. The thickness controlling blade 214 exerts pressure on the developing roller 212 to control the thickness of the toner layer carried on the developing roller 212. The thickness of the toner layer controlled by the thickness controlling blade 213 is between 10 microns to 100 microns on the surface of developing roller 212. The developing roller 212 faces on the photoconductor 220 though a window 222 and the window may be controlled to selectively eject toner 210 onto photoconductor 220.

Provision of the transportation device 204 for moving toner through the developing unit allows the developing unit of FIG. 8 to be made smaller and/or shaped differently than the conventional developing unit. The transportation device 204 also allows the FIG. 8 developing unit to be made without a stirring mechanism. In addition, the transportation device allows a single component developer, that is, a toner ink without carrier, to be used in the developing unit, allowing the developing unit to be made smaller. In presently preferred embodiments of the invention, the transportation device is a mesh belt formed from a conductive material. Each of the toner particles has a diameter ranging from several microns to tens of microns. The mesh of the transportation devices 204 allows the toner particles to pass though, and the openings in the mesh preferably range from tens of microns to hundreds of microns.

FIG. 8 shows a developing unit according to another embodiment of the present invention generally similar to the developing unit shown in FIG. 8 except that a different configuration of a friction device 230 is used instead of the friction device 206 and the second roller 202 of the FIG. 8 embodiment. In the FIG. 9 embodiment, a transportation device 204 is driven by a first roller 200, and the friction device includes a cylinder 230 and a hemispherical shell 232, with the transportation device 204 running between the cylinder 230 and the hemispherical shell 232. The friction device stretches the transportation device 204 to maintain an appropriate tension on the transportation device and also tribocharges the toner. The cylinder 230 rotates as the transportation device 204 is move so that the toner carried by the transportation device 204 is tribocharged by the hemispherical shell 232. Other aspects of the developing operation using the FIG. 9 apparatus are the same as were describes with respect to the FIG. 8 first embodiment, and so the description of those aspects is not repeated.

Figure 10:
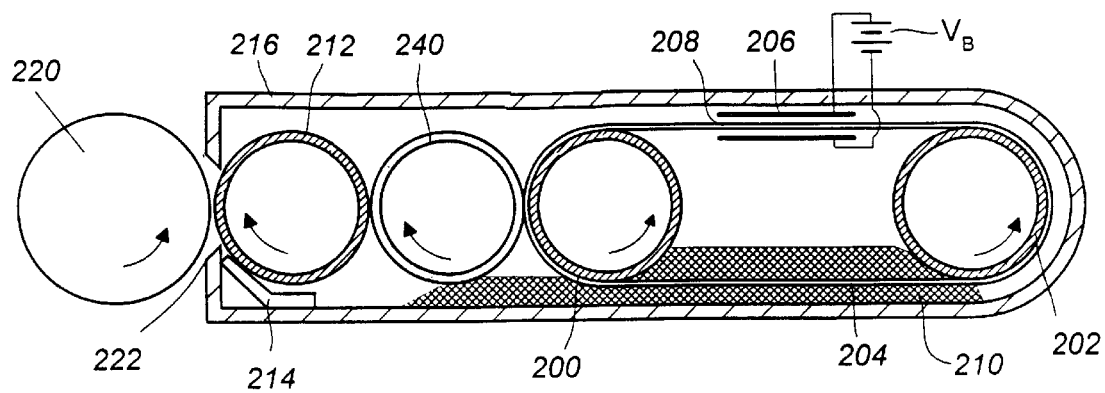

FIG. 10 shows another variation on a developing unit according to the present invention and having a structure substantially the same as that of the FIG. 8 embodiment except that a "fur" or soft roller 230 is added between the first roller 200 and the developing roller 212. The surface of the fur or soft roller 240 might, for example, consist of a polyester or other fiber having a nap on the order of about 0.5–2.0 millimeters. Toner is stored temporarily within the nap on the soft roller as an intermediate reservoir which ensures that there will be a substantially constant supply of toner available to the developing roller 212. Toner 210 is carried by the transportation device 204 and tribocharged by a friction device 206. Next, the charged toner 210 is conveyed to a first roller 200 and then to the soft roller 240. The charged toner is fed from the soft roller 240 to a surface of a developing roller 212, and then provided to the photoconductor 220 via a window 222.

Figure 9:
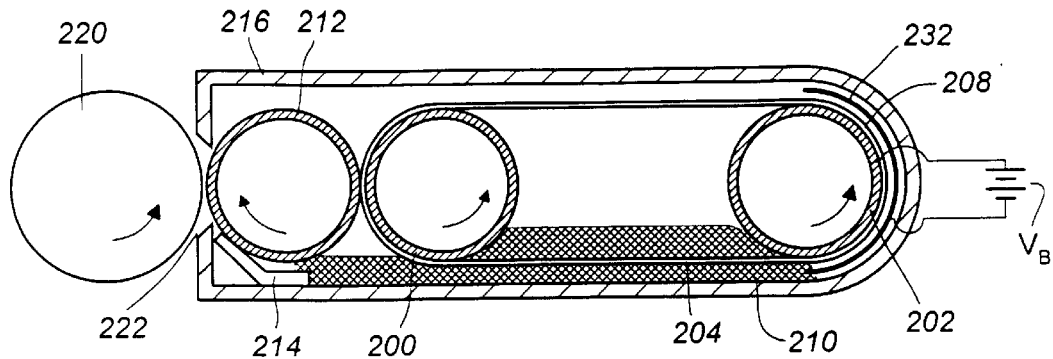

In each of the above embodiments of developing units illustrated in FIGS. 8–10, the contact area of the friction device is large and an endless mesh belt is used to carry toner as it is charged. Consequently, the toner carrying operation is smooth, the load of the developing unit is stable and the power consumption of the developing unit is reduced. Further, reduction in the driving load of the developing unit decreases the size and weight of the developing unit, and the manufacturing cost is also decreased. In addition, since the forces applied to toner particles are reduced, less damage to the toner particles occurs so that the image quality is improved.

The various aspects of the present invention have bee described in terms of certain presently preferred embodiments. Those of ordinary skill will appreciate that modifications to and variations from the preferred embodiments might be made while remaining consistent with the basic teachings of the present invention. As such, the scope of the present invention is not to be limited to the particular described embodiments. Rather, the scope of the present invention is to be determined from the claims, which follow.

What is claimed is:

1. A developing unit, comprising:
   a housing for enclosing components of the developing unit, the housing having an opening through which toner can pass;
   first and second rollers in the housing;
   a belt extending over the first and second rollers, the belt being translated around the first and second rollers in response to rotation of the first and second rollers, the belt capable of transporting toner on a surface of the belt;
   a charging device adjacent at least a portion of the belt, the charging device imparting a charge to toner on the belt passing adjacent the charging device; and
   an output device for transporting toner from the surface of the belt to the opening in the housing.

2. The developing unit of claim 1, wherein the output device comprises a developing roller for receiving toner conveyed by the belt and for providing toner to the opening in the housing.

3. The developing unit of claim 2, wherein the belt comprises openings formed on the surface of the belt.

4. The developing unit of claim 3, further comprising toner particles having a first average diameter, wherein the openings have an average diameter larger than the first average diameter.

5. The developing unit of claim 1, wherein the charging device charges toner by triboelectric charging.

6. The developing unit of claim 3, wherein the charging device comprises a pair of friction plates.

7. The developing unit of claim 6, wherein the friction plates are metal.

8. The developing unit of claim 6, wherein the friction plates are connected to a bias potential.

9. The developing unit of claim 6, wherein the friction plates are nonconductive.

10. The developing unit of claim 2, further comprising a soft roller disposed between the belt and the developing roller, the soft roller having a nap on its surface capable of storing toner.

11. The developing unit of claim 1, wherein the charging device includes a curved plate separated from the second roller by the belt, the curved plate acting in cooperation with the second roller to charge toner passing on the belt between the second roller and the curved plate.

12. The developing unit of claim 11, wherein the curved plate is a hemispherical shell.

13. The developing unit of claim 11, wherein the output device comprises a developing roller for receiving toner conveyed by the belt and for providing toner to the opening in the housing.

14. The developing unit of claim 11, wherein the belt comprises a mesh so that openings are formed on the surface of the belt.

15. The developing unit of claim 14, further comprising toner particles having a first average diameter, wherein the openings have an average diameter larger than the first average diameter.

16. The developing unit of claim 11, wherein the charging device charges toner by triboelectric charging.

17. The developing unit of claim 11, wherein the second roller and the curved plate are metal.

18. The developing unit of claim 17, wherein the second roller and the curved plate are connected to a bias potential.

19. The developing unit of claim 16, wherein the curved plate is nonconductive.

20. The developing unit of claim 13, further comprising a soft roller disposed between the belt and the developing roller, the soft roller having a nap on its surface capable of storing toner.

21. A method of developing used in an electrophotographic process, the method comprising:

driving a transportation system including a belt having a surface for carrying toner particles;

charging the toner particles by passing the toner particles on the belt through opposing friction plates;

conveying the charged toner particles to a developing surface; and transferring the charged toner from the developing surface to a surface of a photoconductor.

22. The method of claim 21, wherein the belt is driven by a set of rollers over which the belt is stretched.

23. The method of claim 21, wherein the belt has a mesh surface having openings larger than the average size of the toner particles.

* * * * *